April 8, 1924.
G. W. WALL
1,489,722
ICE HARVESTING APPARATUS
Filed July 6, 1922  2 Sheets-Sheet 1
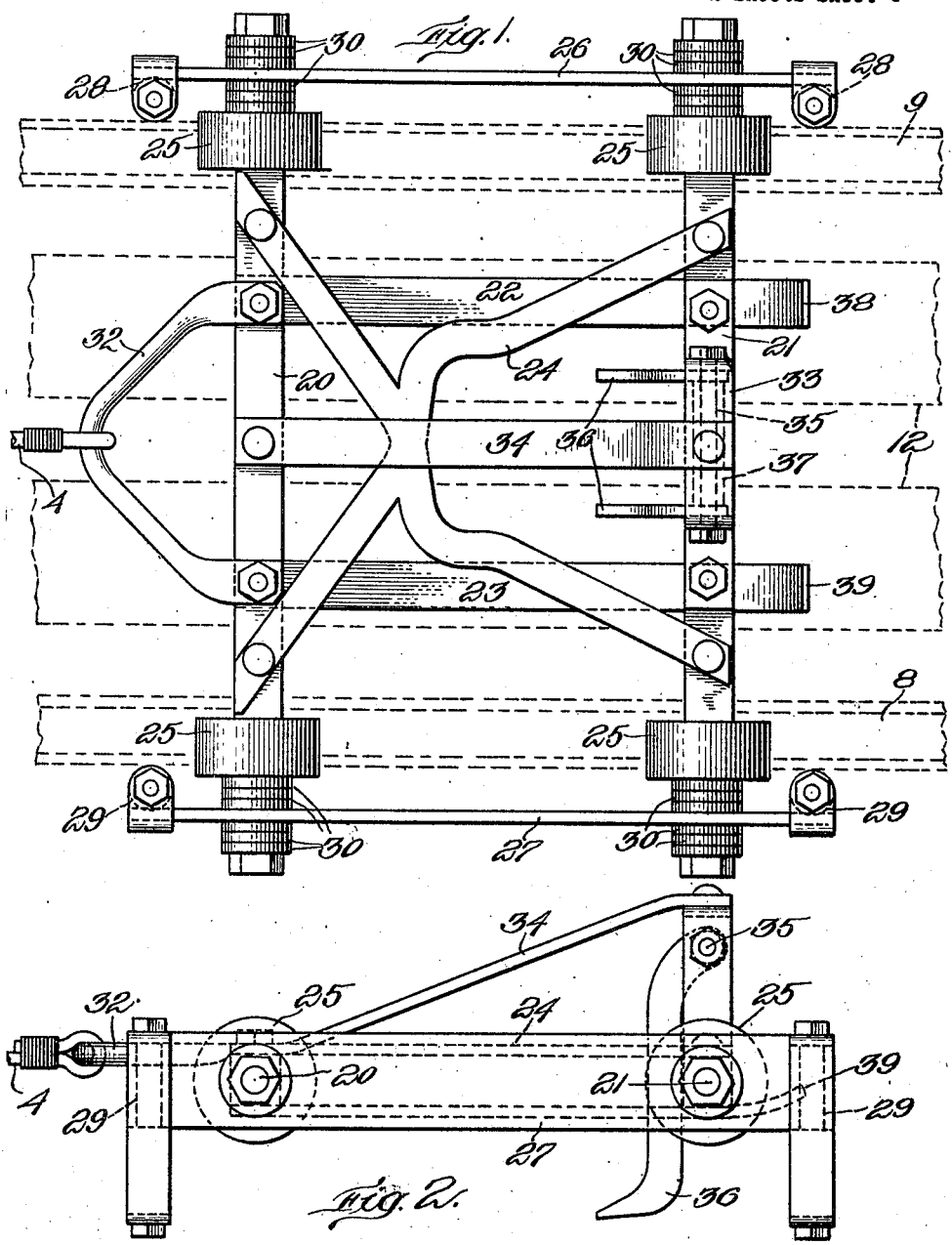

April 8, 1924.
G. W. WALL
1,489,722
ICE HARVESTING APPARATUS
Filed July 6, 1922
2 Sheets-Sheet 2
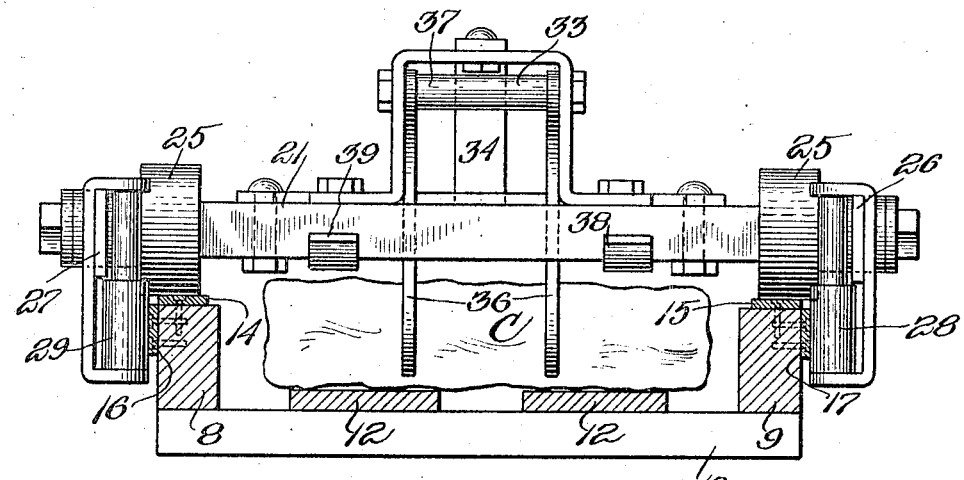
Fig. 3.
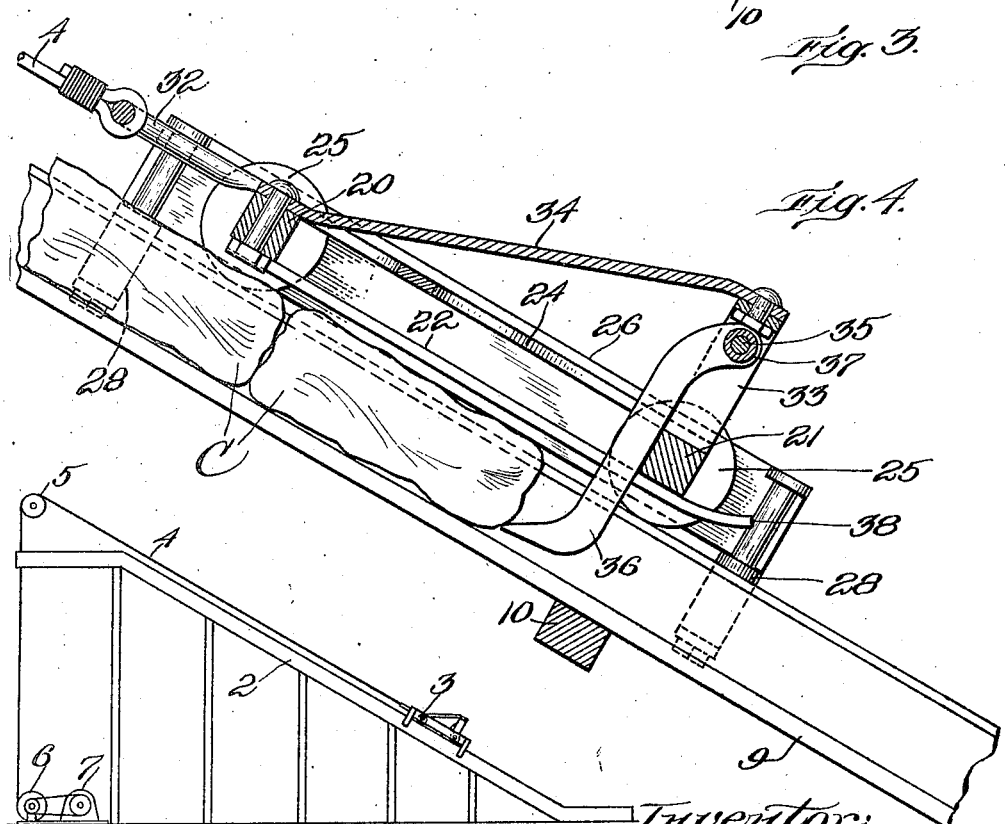
Fig. 4.
Fig. 5.
Inventor:
George W. Wall,
by J. H. McCrady,
his atty.

Patented Apr. 8, 1924.

1,489,722

UNITED STATES PATENT OFFICE.

GEORGE W. WALL, OF PLYMOUTH, MASSACHUSETTS, ASSIGNOR OF ONE-HALF TO ADONIRAM J. SMITH, OF PLYMOUTH, MASSACHUSETTS.

ICE-HARVESTING APPARATUS.

Application filed July 6, 1922. Serial No. 573,201.

*To all whom it may concern:*

Be it known that I, GEORGE W. WALL, a citizen of the United States, residing at Plymouth, in the county of Plymouth and State of Massachusetts, have invented certain new and useful Improvements in Ice-Harvesting Apparatus, of which the following is a specification.

This invention relates to ice harvesting apparatus of the character employed in small ice plants which are not equipped with the conveying apparatus used in larger plants. In plants which depend on a natural supply of ice, the ice is cut and carried into the icehouse on an inclined runway usually leading to distributing runways along which the ice can be pushed into the icehouse at different levels. In small plants it is a common practice to run a line of cakes of ice into the foot of the runway and then engage a hook with the outermost cake, this hook being attached to the end of a cable that leads up the runway to a hoisting drum operated in some convenient manner. The line of cakes so arranged is thus hauled up the runway and a workman then grabs the hook and carries it down the runway in readiness to repeat this operation. The harvesting of ice in this manner obviously is relatively slow and laborious, and the duties of the man employed on the runway are not only arduous, but oftentimes dangerous. These conditions are well recognized by the proprietors of the ice plants, but the quantity of ice handled does not warrant them in installing the more elaborate conveying equipment that is used by large plants., The present invention aims to improve ice harvesting apparatus with a view to facilitating the hauling of the ice into the icehouse and particularly with the object of eliminating the necessity of employing a man on the runway, as above described. Stated more specifically, the invention aims to devise a simple form of ice carrier or conveyor which will take the place of the hook above mentioned, will be sufficiently automatic in its operation to avoid the necessity of employing a man to walk back and forth on the runway, as above described, and which can be manufactured so economically that it can be used profitably even in very small plants.

The nature of the invention will be readily understood from the following description when read in connection with the accompanying drawings, and the novel features will be particularly pointed out in the appended claims.

Referring now to the drawings,

Figure 1 is a plan view of an ice carrier or elevating device constructed in accordance with the present invention;

Fig. 2 is a side elevation of the carrier shown in Fig 1;

Fig. 3 is a rear elevation of the carrier, showing it in its operative position on a runway;

Fig. 4 is a central vertical cross sectional view of the carrier shown in Figs. 1, 2 and 3; and Fig. 5 is a diagrammatic view showing the general organization of the parts that cooperate with the carrier.

Referring first to Fig. 5, the runway up which the ice is carried is indicated at 2, and the carrier or elevating device provided by this invention is shown at 3, this carrier being connected to a cable 4 running over a pulley 5 on a drum 6 which is driven by a suitable motor 7. The cross-sectional construction of a typical runway is best shown in Figs. 3 and 4, from which it will be seen that it comprises two side pieces 8 and 9 connected by a series of cross pieces 10, the latter pieces supporting planks 12—12 that extend longitudinally of the runway and support the cakes of ice C. Metal shoes 14 and 15 are secured to the tops of the side rails 8 and 9 and similar shoes 16 and 17, respectively, are secured to the outer faces of these side pieces to take the wear of the carriage or slide that pushes the ice up the runway.

The ice carrier or carriage shown comprises front and rear frame members 20 and 21, respectively, connected by straps 22 and 23 and by a brace 24. The members 20 and 21 form front and rear axles having their end portions turned to receive wheels 25, the two wheels at each side running on the opposite side pieces or rails 8 and 9 of the runway. In order to guide the carriage laterally on the runway, frame pieces or plates 26 and 27, respectively, are secured to the ends of the front and rear axle members 20 and 21 and each frame piece has riveted to its opposite ends a bracket carrying a roll that bears against one of the side pieces. The rolls thus mounted on the plate 26 are designated at 28—28 and those on the part 27 at 29—29. It should be noticed that each of the members 26 and 27 is spaced from its adjacent wheel 25 by a series of washers 30, so that by changing the arrangement of these washers the two sets of rolls 28 and 29 at opposite sides of the machine can be adjusted toward and from each other to accommodate runways of different widths.

The hoisting cable 4 is connected to the carriage through a clevice 32 which is bolted to the front axle 20.

Bolted to the upper side of the rear axle 21 is an inverted U-shaped bracket 33 which is connected to the front axle by a brace 34. A shaft 35 is supported horizontally in the opposite side members of this bracket 33 and has pivoted thereon two ice pushing dogs 36—36, these dogs being held apart by a spacing sleeve 37. The dogs normally rest by gravity in a substantially upright position, but they are free to swing forward in a clockwise direction, as shown in Fig. 4, about the shaft 35.

In using the apparatus a line of cakes of ice are arranged at the foot of the runway in the usual manner. The carriage is then allowed to slide down the runway by gravity until it arrives in a position somewhat beyond the outermost cake in the line. When the dogs 36—36 strike the foremost cake, they will be swung thereby out of the position shown in Fig. 4 and will simply ride over the cakes, dropping again into the position shown in Fig. 4 after the carriage has passed the outermost cake. The hoisting drum is then reversed to draw the carriage up the runway, and when the dogs 36—36 strike the outermost cake, they push this cake, and with it those in front of it, along up the runway with the carriage. It will be noted that, at this time, the dogs are prevented from swinging backwardly by their engagement with the rear axle 21, Fig. 4. When the line of cakes has been delivered at the top of the runway the carriage will be allowed to descend again and the operations just described will be repeated. It should be noted that the rear ends of the straps 22 and 23 are turned up slightly, as shown at 38 and 39, so that if the carriage should strike an abnormally high cake as it slides down the runway, it will simply ride over such a cake and continue on its way.

It will now be appreciated that this invention provides a very simple and inexpensive piece of apparatus which saves the work of one man in the operation of hauling ice into an icehouse. It will also be understood that while I have herein shown and described the best embodiment of the invention of which I am at present aware, this embodiment may be modified in minor particulars without departing from the spirit or scope of this invention.

Having thus described my invention, what I desire to claim as new is:

1. An ice harvesting apparatus comprising, in combination, a runway, a carriage mounted on said runway and having rolls which support it horizontally and guide it laterally on the runway, means supporting the lateral guiding rolls for adjustment to accommodate different widths of runways, a pair of dogs pivotally mounted on said carriage and normally held by gravity in position to engage a cake of ice and push said cake a certain direction along the runway, said dogs being movable automatically out of operative position by contact with a cake of ice when the carriage is moved in the opposite direction, and means for moving said carriage along said runway.

2. A carrier for ice harvesting apparatus, comprising a carriage having rolls to support the same on a runway, additional rolls at each side of said carriage for guiding the carriage laterally on the runway, means whereby said lateral guiding rolls at opposite sides of the carriage may be adjusted toward and from each other, and an ice pushing dog pivotally mounted on said carriage.

3. A carrier for ice harvesting apparatus, comprising a carriage having rolls to support the same on a runway, additional rolls at each side of said carriage for guiding the carriage laterally on the runway, and a dog movably mounted on said carriage and operative to push a cake of ice along the runway when the carriage is moved in one direction but to ride over the cake of ice when the carriage is moved in the opposite direction.

4. A carrier for ice harvesting apparatus, comprising a carriage having rolls to support the same on a runway, additional rolls at each side of said carriage for guiding the carriage laterally on the runway, an ice pushing dog pivotally mounted on said carriage, and straps 22 and 23 extending longitudinally of said carriage and having their rear ends 38 and 39, respectively, turned upwardly.

GEORGE W. WALL.